United States Patent

Kagata et al.

[11] Patent Number: 5,769,988
[45] Date of Patent: Jun. 23, 1998

[54] METHOD OF MANUFACTURING A CERAMIC ELECTRONIC COMPONENT

[75] Inventors: Hiroshi Kagata; Ichiro Kameyama; Tatsuya Inoue; Junichi Kato, all of Osaka, Japan

[73] Assignee: Matsushita Electric Industrial Co., Ltd., Osaka, Japan

[21] Appl. No.: 752,837

[22] Filed: Nov. 20, 1996

[30] Foreign Application Priority Data

Nov. 28, 1995 [JP] Japan .................................. 7-309127

[51] Int. Cl.⁶ .............................. C04B 37/00; B05D 5/12
[52] U.S. Cl. ............................ 156/89; 264/620; 427/125
[58] Field of Search .................................... 264/614, 615, 264/616, 617, 618, 619, 620, 621; 427/79, 96, 125; 156/89

[56] References Cited

U.S. PATENT DOCUMENTS 4,795,670  1/1989  Nishigaki et al. ...................... 428/209
4,977,485  12/1990  Mori et al. .............................. 361/321

FOREIGN PATENT DOCUMENTS 6-163320  6/1994  Japan .
7-201224  8/1995  Japan .

*Primary Examiner*—Christopher A. Fiorilla
*Attorney, Agent, or Firm*—Merchant, Gould, Smith, Edell, Welter & Schmidt, P.A.

[57] ABSTRACT

A method of manufacturing a ceramic electronic component having a dielectric ceramic and a conductor containing Ag as a main component, wherein a dielectric resonator with a high Q value is produced by heat treating at 400° C. or more in an atmosphere containing 10% or less by volume of oxygen after sintering the dielectric ceramic. Using a BaO—$TiO_2$—$Nd_2O_3$—$Bi_2O_3$ based composition ($\epsilon_r$=92, Qf=5000 GHz) as a dielectric, a coaxial type dielectric ceramic is produced by granulating calcined powder of the dielectric and then compacting the powder, followed by sintering. A dielectric resonator of $\lambda/4$ is produced by coating the dielectric ceramic with Ag paste at a position other than either the upper or lower side and then burning the paste. Thereafter, the electrodes(1,4) are formed by burning the paste at 400° C. or more in an atmosphere containing 10% or less by volume of oxygen. The coaxial type dielectric resonator accepts electromagnetic waves from the open end and obtains output by utilizing TEM mode.

8 Claims, 1 Drawing Sheet

METHOD OF MANUFACTURING A CERAMIC ELECTRONIC COMPONENT

FIELD OF THE INVENTION

The invention relates to a method of manufacturing a ceramic electronic component comprising dielectric ceramics and conductors for use within the range of high frequencies.

BACKGROUND OF THE INVENTION

As telecommunication technology utilizing electromagnetic waves within the range of microwave, including a car telephones, portable telephones, and satellite broadcasting, has developed, demands for a component of high frequencies and with small loss have been increasing in recent years. An electronic part for high frequencies comprising dielectric ceramics and conductors, for example a dielectric resonator, a dielectric filter or a condenser, frequently utilizes Ag of high conductivity as conductors in order to make the loss smaller. A conventional dielectric filter is manufactured by combining dielectric resonators produced by forming conductor patterns of Ag paste on required parts of the surface of sintered cylindrical or prismatic dielectric ceramics having through holes in a vertical direction, and then burning the conductors by heat treating in air. Furthermore, a laminated type dielectric filter developed in recent years, as disclosed in Japanese Patent Application No. Hei 6-163320, is produced by the steps of printing Ag paste on a ceramic green sheet along various conductor patterns, pressing and then sintering the sheet, and further forming terminal electrodes of Ag paste and burning the electrodes in air.

However, there were problems such that the Q values of dielectric resonators produced by said methods were not sufficient so that big losses were produced when they were formed into a filter. Therefore, there had been demands for developing a method of manufacturing a ceramic electronic component to obtain a dielectric resonator with a higher Q value.

SUMMARY OF THE INVENTION

An object of this invention is to provide a method of manufacturing a ceramic electronic part, wherein the ceramic electronic part comprises a dielectric ceramic and a conductor, in order to obtain an improved dielectric resonator with a higher Q value.

In order to provide said object, the method of manufacturing a ceramic electronic component of the invention, wherein the ceramic electronic component comprises at least a dielectric ceramic and a conductor containing Ag as a main component, comprises heat treating the dielectric ceramic at 400° C. or more in an atmosphere containing 10% or less by volume of oxygen after sintering the dielectric ceramic. It is preferable that the conductor contain 30% or more by weight of Ag as a main component.

It is preferable that the ceramic electronic component is either a coaxial type resonator or a dielectric filter comprising a dielectric ceramic, having through holes in a vertical direction, wherein a conductor containing Ag as a main component is formed partially or entirely on the outer surface of the dielectric ceramic at a position other than either the upper or lower side of the ceramic and on the inner surface of the through hole.

It is preferable that the ceramic electronic component is either a resonator or a filter of laminated structure which has conductive layers containing Ag as a main component inside the dielectric ceramic.

It is preferable that the atmosphere for heat treating contains 99% or more by volume of nitrogen and 0.1% or less by volume of oxygen.

It is preferable that the dielectric ceramic contains at least Bi, preferably in the range of 10–90% by weight of Bi, with respect to the amount of metal not including oxigen.

It is preferable that the dielectric ceramic contains at least $Bi_2O_3$, CaO, and $Nb_2O_5$, preferably in the range of 20–80% by weight of $Bi_2O_3$, 5–60% by weight of CaO, and 10–70% by weight of $Nb_2O_5$.

It is preferable that the dielectric ceramic contains at least Mn, preferably in the range of 0.02–3% by weight of Mn, with respect to the amount of metal not including oxigen.

It is preferable that the dielectric ceramic contains at least BaO and $TiO_2$, preferably in the range of 5–45% by weight of BaO and 55–95% by weight of $TiO_2$.

It is preferable that after sintering the dielectric ceramic, conductive paste containing Ag as a main component is coated on required parts, and then the paste is heat treated at 400° C. or more in an atmosphere containing 10% or less by volume of oxygen It is preferable that after sintering the dielectric ceramic, terminal electrodes containing Ag or Cu as a main component are formed and then heat treated at 400° C. or more in an atmosphere containing 10% or less by volume of oxygen.

According to the manufacturing method of a ceramic electronic component of the invention, wherein the ceramic electronic component comprises at least a dielectric ceramic and a conductor containing Ag as a main component, a dielectric resonator can be provided with a higher Q value by heat treating the dielectric ceramic at a 400° C. or more in an atmosphere containing 10% or less by volume of oxygen, after sintering the dielectric ceramic.

DETAILED DESCRIPTION OF THE INVENTION

Figure 1A:
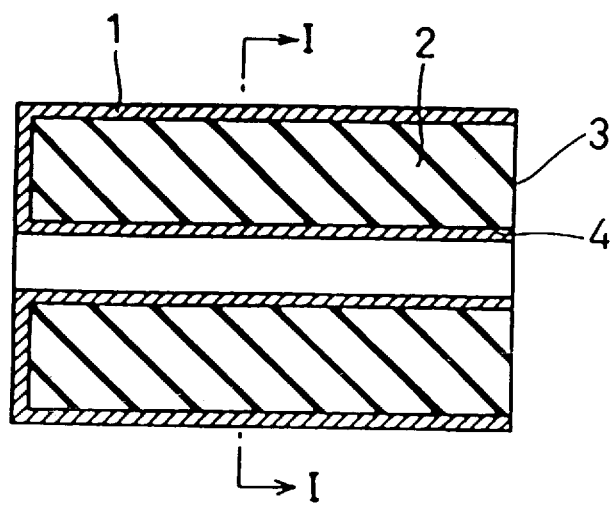
FIG. 1A is a cross-sectional view taken in the direction along the axis of the cylindrical and coaxial dielectric resonator of one embodiment of the invention.

The dielectric ceramics used in the invention may be selected from the group consisting of $BaO—TiO_2$, $BaO—TiO_2—Nd_2O_3—Bi_2O_3$, $BaO—TiO_2—Nd_2O_3—B_2O_3—SiO_2—PbO$, $Bi_2O_3—CaO—Nb_2O_5$, $ZrO_2—TiO_2—SnO_2$, $PbO—CaO—ZrO_2$, $MgTiO_3—CaTiO_3$, $Ba(Zn,Ta)O_3$, and $Ba(Mg,Ta)O_3$ based compositions and the like, in which the loss in the range of high frequencies is small. The conductors used in the invention may be selected from the group consisting of Ag, Ag—Pt, Ag—Pd and the like, which contain Ag in a large proportion and have high conductivity.

It is preferable that the electronic component of the invention is selected from the group consisting of a coaxial type resonator, a dielectric filter formed by combining coaxial type resonators, a laminated type resonator, a laminated type filter, a laminated condenser for use within high frequencies and the like.

Calcined powder of dielectric ceramics is produced by mixing predetermined amounts of suitable oxides, calcining the mixture, and thereafter grinding the mixture. A ball mill is used for the mixing and grinding. Pure water or alcohol is used as a solvent, and a ball mill made of zirconia or almina and having a diameter of about 5 mm is used in this step. The calcining temperature is usually from 600° C. to 1200° C., although it is different depending on the compositions. If the calcining temperature is too low, starting materials remain. If the calcining temperature is too high, the subsequent grinding becomes difficult.

A method of manufacturing a coaxial type resonator is as follows:

A binder is added to the calcined powder of the dielectric ceramic and is mixed together, and then the mixture is granulated through a mesh. It is preferable to use a polyvinyl alcohol (PVA) based composition as a binder and also to use a mesh of about 30-mesh. The granulated powder is formed into a coaxial shape by pressing, and then the powder is sintered in an electric furnace. It is preferable that the sintering temperature is from 800° C. to 1600° C. Sintering at a temperature below this range is insufficient, while sintering at a temperature above this range results in dissolution. After coating the surface of the sintered element with conductive paste, the paste is burned by heat treating at 400° C. or more in an atmosphere containing 10% or less by volume of oxygen. If the temperature is less than 400° C., adhesive bonding strength of the conductor is insufficient, resulting in low conductivity, while if the temperature is more than 960° C., Ag contained in the conductor becomes melted. The atmosphere for heat treating is controlled with gases such as $N_2$, Ar, $CO_2$, $O_2$, $H_2$, and CO. It is preferable that an electric furnace which can control atmosphere, for example a tube furnace, is used for heat treating, and the oxygen concentration in the furnace is monitored by, for example a zirconia sensor. Heat treating in an atmosphere containing more than 10% by volume of oxygen is not enough to obtain the effect of the invention sufficiently. Furthermore, a similar effect can be obtained by burning the conductor paste by heat treating in air, and thereafter heat treating at 400° C. or more in an atmosphere containing less than 10% by volume of oxygen.

Figure 1B:
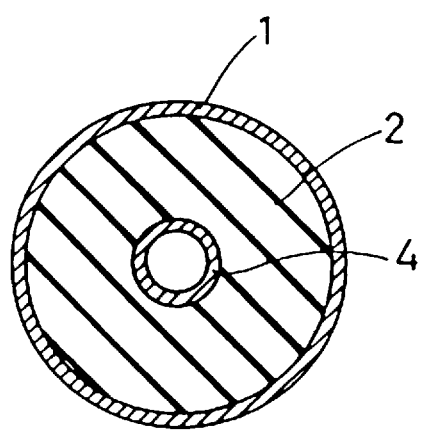
FIG. 1B is a cross-sectional view taken on line I—I of FIG. 1A.

Referring to the attached figures, one embodiment of a cylindrical coaxial dielectric resonator is illustrated as follows:

FIG. 1A is a cross-sectional view taken in the direction along the axis of a cylindrical coaxial dielectric resonator, and the electrodes 1 and 4 are continuously formed partially or entirely on the surface of the cylindrical dielectric ceramic 2 other than on the open end 3. FIG. 1B is a cross-sectional view taken on line I—I of FIG. 1A. This cylindrical coaxial dielectric resonator accepts electromagnetic waves at the open end 3, and produces output by utilizing resonance of electromagnetic waves in a specific range of frequencies (TEM mode).

A method of manufacturing a laminated type resonator is as follows:

A binder, a plasticizer and a solution are added to calcined powder of dielectric ceramic and mixed together. It is preferable to use a polyvinyl butyral (PVB) or acrylic based composition as a binder. It is also preferable to use a di-t-butyl phthalate (DBP) or a butyl benzyl phthalate (BBP) as a plasticizer. It is preferable to use ester, alcohol, or water as a solution. The mixture is formed into a sheet by doctor blading or reverse rolling, and thereafter the sheet is cut into a predetermined size, and conductive paste is printed on the given sheet by screen printing. It is preferable that the thickness of the sheet is within the range of between 20 $\mu$m and 300 $\mu$m. If it is thinner than this range, subsequent processing becomes difficult, while if it is thicker than this range, cracking easily occurs during drying. The sheets are laminated and bonded by pressing, and then cut into sections. The sheets are bonded by uniaxial pressing or applying hydrostatic pressure. Thereafter, it is either possible that terminal electrodes are formed after sintering, or that burning the paste and sintering are conducted at the same time after a pattern of terminal electrodes is formed with paste. It is preferable that Ag, Ag—Pt, Ag—Pd, Cu or the like is used for terminal electrodes, and that the electrodes are formed by, for example printing, coating, impregnation or plating. Furthermore, the sheets may also be cut into sections after the sheets are bonded by pressing and thereafter sintered. The conditions of the sintering and the subsequent heat treating are the same as those in the method of manufacturing a coaxial type resonator as described above.

The Q value of the resulting resonator is determined by using a network analyzer.

The invention will be explained in detail with reference to the attached figures and the following examples. The examples are illustrative and should not be construed as limiting the invention in any way.

EXAMPLE 1

A coaxial type dielectric resonator was manufactured as follows.

A $BaO—TiO_2—Nd_2O_3—Bi_2O_3$ based composition($\epsilon$= 92, Qf=5000 GHz) was used as a dielectric. The amount of the components was weighed so that the ratio of the composition becomes $BaCO_3$:13.7 $TiO_2$:68.5 $Nd_2O_3$:13.7 $Bi_2O_3$:4.1, and that the total amount of the composition becomes 100 g. Boulders made of zirconia having a diameter of 5 mm, 200 ml of pure water, and the weighed powder of the composition was put into a 600 ml-volume pot made of resin and thereafter the pot was rotated at a speed of 80 rpm for 15 hours to mix the contents. After suction filtration, the mixture was dried at 150° C. Then the dried mixture was put into a crucible made of almina and calcined at 1050° C. The calcined mixture was grinded by the same process as in the mixing step described above and then dried by the same process as in the step following the mixing to produce dielectric ceramic powder. After being compacted, the powder was sintered at 1400° C. in air to produce a coaxial type dielectric ceramic of 8 mm in length, 3 mm in diameter, and 0.8 mm in diameter of the center hole. Dielectric resonators of $\lambda$/4 were produced by coating the surface of the dielectric ceramic with Ag paste at a position other than either the upper or lower side, and then burning the paste at 800° C. in air, or at various temperatures in atmospheres containing various proportions of oxygen. Among these dielectric resonators, those in which paste was burned in air were heat treated at various temperatures in atmospheres containing various proportions of oxygen. The proportions of oxygen contained in the atmospheres were controlled by varying the amounts of $N_2$ and $O_2$ gases. The Q values of the resulting dielectric resonators were determined as shown in Table 1.

TABLE 1

| No. | Conditions of electrodes burning | | Conditions of heat treating | | Q values | |
|---|---|---|---|---|---|---|
| | Percentage of oxygen contained in an atmosphere (%) | Temperature (°C.) | Percentage of oxygen contained in an atmosphere (%) | Temperature (°C.) | Before heat treatment | After heat treatment |
| 1 | 21.0 (air) | 800 | 0.001 | 800 | 232 | 269 |
| 2 | | | 0.05 | 300 | 232 | 231 |
| 3 | | | 0.05 | 400 | 232 | 240 |
| 4 | | | 0.05 | 800 | 232 | 270 |
| 5 | | | 0.1 | 800 | 232 | 260 |
| 6 | | | 10.0 | 800 | 232 | 241 |
| 7# | | | 21.0 | 800 | 232 | 229 |
| 8 | 0.001 | 800 | | | 270 | — |
| 9# | 0.05 | 300 | | | undetermined | — |
| 10 | 0.05 | 400 | none | | 239 | — |
| 11 | 0.05 | 800 | | | 277 | — |
| 12 | 0.1 | 800 | | | 262 | — |
| 13 | 10.0 | 800 | | | 240 | — |

Notes:
The numbers with # show comparative examples.

As shown in Table 1, the Q values of the dielectric resonators in which paste had been burned at 400° C. or more in an atmosphere containing 10% or less by volume of oxygen were higher than the Q values of the dielectric resonators in which paste had been burned in normal air. Furthermore, as for the dielectric resonators in which paste had been burned in air, the Q values of those which had been heat treated at 400° C. or more in an atmosphere containing 10% or less by volume of oxygen were higher than the Q values of those which had not been heat treated. Still furthermore, as for the dielectric resonators which had been heat treated in air, the Q values were further higher when it had been heat treated in an atmosphere containing 0.1% by volume of oxygen.

EXAMPLE 2

A laminated type resonator was manufactured as follows: BaO—$TiO_2$—$Nd_2O_3$—$B_2O_3$—$SiO_2$—PbO($\epsilon_r$=75, Qf=2500 GHz), BaO—$TiO_2$—$Nd_2O_3$—$Bi_2O_3$—$B_2O_3$—$SiO_2$—PbO($\epsilon_r$=80, Qf=2500 GHz), and $Bi_2O_3$—CaO—$Nb_2O_5$($\epsilon_r$=57, Qf=2400 GHz) based compositions were used as dielectrics. These compositions are referred to as material (1), material(2) and material(3), respectively. The amount of the components for each material was weighed so that the ratio of the composition becomes BaO:10.0 $TiO_2$:49.8 $Nd_2O_3$:10.0 $B_2O_3$:12.0 $SiO_2$:4.4 PbO:13.6 for material (1), BaO:11.0 $TiO_2$:54.8 $Nd_2O_3$:11.0 $Bi_2O_3$:3.3 $B_2O_3$:8.0 $SiO_2$:2.4 PbO:9.6 for material (2), and $Bi_2O_3$:47.8 CaO:20.9 $Nb_2O_5$:31.3 for material (3), and that the total amount of the composition for each material becomes 100 g. Calcined powder of dielectric ceramic was produced from each material by the same process as in the Example 1. The powder was changed into a slurry together with a binder, a plasticizer, and a solution, and green sheets were formed by doctor blading. A predetermined conductor pattern was formed on the green sheets by screen printing of Ag paste, and the sheets were laminated and then bonded by pressing. After the laminated sheets were cut into sections, a pattern of terminal electrodes was formed on the sheets by coating with Ag paste and then the pattern was sintered at 900° C. in air. The size of the element of the sheets was 8 mm by length, 5 mm by width, and 2.5 mm by height. Furthermore, the element was heat treated at 800° C. in an atmosphere containing 40 ppm/°C. oxygen. The Q values of the resulting laminated type resonators were determined as shown in Table 2.

TABLE 2

| | | Q value | |
|---|---|---|---|
| No. | material | Before heat treatment | After heat treatment |
| 1 | (1) | 170 | 180 |
| 2 | (2) | 169 | 199 |
| 3 | (3) | 172 | 210 |

As shown in Table 2, the Q value of a laminated type resonator was improved by heat treating at 800° C. in an atmosphere containing 40 ppm/°C. of oxygen when either material (1), (2), or (3) was used as a dielectric ceramic. Furthermore, the improvement rate of Q value was high when a composition containing $Bi_2O_3$ as material (2) was used as the dielectric ceramic. Still furthermore, improvement rate of Q value was further higher when a $Bi_2O_3$—CaO—$Nb_2O_5$ based composition as material (3) was used as the dielectric ceramic.

EXAMPLE 3

A method of manufacturing a coaxial type resonator is as follows:

A $ZrO_2$—$TiO_2$—$SnO_2$ based composition ($\epsilon_r$=37, Qf=50000 GHz), a BaO—$TiO_2$ based composition ($\epsilon_r$=36, Qf=40000 GHz) and a $ZrO_2$—$TiO_2$—$SnO_2$—$MnO_2$ based composition ($\epsilon_r$=36, Qf=47000 GHz) were used as dielectrics. These compositions are referred to as material (4), (5), and (6), respectively. The amount of the components for each material was weighed so that the ratio of the composition becomes $ZrO_2$:40 $SnO_2$:10 $TiO_2$:50 for material (4), BaO:20 $TiO_2$:80 for material (5), and $ZrO_2$:39.8 $SnO_2$:10 $TiO_2$:49.4 $MnO_2$:0.8 for material (6), and that the total amount of the composition for each material becomes 100 g. Calcined powder of dielectric ceramic was produced from each material by the same process as in the Example 1. After being compacted, the powder was sintered at 1450° C. in air to produce a coaxial type dielectric ceramic 8 mm in length, 3 mm in diameter and 0.8 mm in diameter of the center hole. A dielectric resonator of λ/4 was produced by coating the surface of the dielectric ceramic with Ag paste at a position other than either the upper or lower side and burning the paste at 800° C. in air. This dielectric resonator was heat treated at 850° C. in a $N_2$ atmosphere containing 40 ppm/°C. of oxygen. Q values of the resulting dielectric resonators were determined as shown in Table 3.

TABLE 3

| | | Q value | |
|---|---|---|---|
| No. | material | Before heat treatment | After heat treatment |
| 1 | (4) | 335 | 351 |
| 2 | (5) | 334 | 362 |
| 3 | (6) | 332 | 381 |

As shown in Table 3, the Q value of a laminated type resonator was improved by heat treating at 800° C. in an atmosphere containing 40 ppm/°C. of oxygen when either material (4), (5) or (6) was used as the dielectric ceramic.

Furthermore, the improvement rate of the Q value was high when a composition containing at least BaO and TiO$_2$ as material (5) was used as the dielectric ceramic. Still furthermore, the improvement rate of the Q value was also high when a composition containing Mn as material (6) was used as the dielectric ceramic.

As described above, according to the method of manufacturing a ceramic electronic component of the invention, wherein the ceramic electronic component comprises at least a dielectric ceramic and a conductor containing Ag as a main component, the Q value of a dielectric resonator can be made higher by heat treating at 400° C. or more in an atmosphere containing 10% or less by volume of oxygen after sintering the dielectric ceramic.

We claim:

1. A method of manufacturing a ceramic electronic component that comprises as main components a dielectric ceramic and a conductor containing silver, the method comprising:

sintering a dielectric ceramic;

forming a conductive paste containing silver as a main component in a pattern of electrodes on the sintered dielectric ceramic;

subjecting the sintered dielectric ceramic with conductive paste formed thereon to heat treatment in an oxidizing atmosphere; and then subjecting the sintered dielectric ceramic with the conductive paste formed thereon to a heat treatment at 400° C. or more in an atmosphere containing 10% or less by volume of oxygen.

2. The method according to claim 1, wherein the ceramic electronic component is a coaxial resonator or a dielectric filter comprising a dielectric ceramic, having through holes in a vertical direction, and wherein a conductor containing Ag as a main component is formed partially or entirely on an outer surface of said dielectric ceramic at a position other than either the upper or lower side and on the inner surface of said through holes.

3. The method according to claim 1, wherein the ceramic electronic component is a resonator or a filter of laminated structure having conductive layers containing Ag as a main component inside the dielectric ceramic.

4. The method according to claim 1, wherein the atmosphere for heat treating contains 99% or more by volume of nitrogen and 0.1% or less by volume of oxygen.

5. The method according to claim 1, wherein the dielectric ceramic comprises Bi.

6. The method according to claim 5, wherein the dielectric ceramic comprises Bi$_2$O$_3$, CaO, and Nb$_2$O$_5$.

7. The method according to claim 1, wherein the dielectric ceramic comprises Mn.

8. The method according to claim 1, wherein the dielectric ceramic comprises BaO and TiO$_2$.

* * * * *